United States Patent
Klotten et al.

(10) Patent No.: US 6,942,027 B2
(45) Date of Patent: Sep. 13, 2005

(54) EXHAUST-GAS HEAT RECOVERY APPLIANCE

(75) Inventors: Thomas Klotten, Cologne (DE); Roman Heckt, Aachen (DE)

(73) Assignee: Visteon Global Technologies, Inc., Van Buren Township, MI (US)

( * ) Notice: Subject to any disclaimer, the term of this patent is extended or adjusted under 35 U.S.C. 154(b) by 151 days.

(21) Appl. No.: 10/277,376

(22) Filed: Oct. 22, 2002

(65) Prior Publication Data

US 2003/0106683 A1 Jun. 12, 2003

(30) Foreign Application Priority Data

Oct. 30, 2001 (DE) .......................................... 101 53 383

(51) Int. Cl.[7] .............................. F16K 1/22; F01P 11/20; B60H 1/20; F01N 7/00
(52) U.S. Cl. .......................... 165/283; 165/284; 165/51; 165/103; 165/158; 60/309; 60/320
(58) Field of Search .......................... 165/103, 51, 283, 165/158, 284; 60/309, 320

(56) References Cited

U.S. PATENT DOCUMENTS

| | | |
|---|---|---|
| 2,087,411 A | 7/1937 | Lundquist |
| 3,968,649 A | 7/1976 | Edwards |
| 4,249,375 A | 2/1981 | Grundmann et al. |
| 4,391,235 A | 7/1983 | Majkrzak |
| 4,884,744 A | 12/1989 | Padgaonkar |
| 5,121,602 A | 6/1992 | McCorvey |
| 6,739,579 B1 * | 5/2004 | Rim ........................... 251/306 |
| 2001/0020363 A1 | 9/2001 | Strahle et al. |

FOREIGN PATENT DOCUMENTS

| | | | | |
|---|---|---|---|---|
| GB | 2 301 177 | | 11/1996 | |
| JP | 60255524 | | 12/1985 | |
| JP | 61218416 A | * | 9/1986 | ............ B60H/1/20 |
| JP | 62085111 A | * | 4/1987 | ............ F01N/5/02 |
| JP | 05079791 A | * | 3/1993 | ............ F28F/9/02 |
| JP | 07259549 A | * | 10/1995 | ............ F01N/7/00 |
| JP | 8246964 | | 9/1996 | |
| JP | 2001140636 A | * | 5/2001 | ............ F01N/3/28 |
| JP | 2001182627 A | * | 7/2001 | ............ F02M/25/07 |
| WO | WO 01/50047 | | 7/2001 | |

* cited by examiner

*Primary Examiner*—John K. Ford
(74) *Attorney, Agent, or Firm*—Brinks Hofer Gilson & Lione

(57) ABSTRACT

An exhaust-gas heat recovery appliance having a heat-exchanger line and a bypass line and a heat exchanger being arranged in the region of the heat-exchanger line. At least one valve device, for the purpose of influencing the mass flow of exhaust gas, is provided in the heat-exchanger line and the bypass line. Further, at least the heat-exchanger line has a slope in the direction of flow of the exhaust gas in the installed position.

17 Claims, 2 Drawing Sheets

EXHAUST-GAS HEAT RECOVERY APPLIANCE

BACKGROUND

1. Field of the Invention

This invention relates to an improved exhaust-gas heat recovery appliance.

2. Description of Related Art

Exhaust-gas heat recovery appliances are known from the prior art, e.g. U.S. Pat. No. 4,249,375, which proposes a heat exchanger situated before the muffler, in relation to the direction of exhaust-gas flow, of an internal combustion engine. Engine coolant is used to absorb heat from the hot exhaust gases of the internal combustion engine while flowing through the heat exchanger.

To drain off any condensed water that may have formed from cooling exhaust gas, the exhaust-gas zone of the heat exchanger is connected by a drainage line to a region of the exhaust system that is situated further back, allowing any condensed water that does form to flow out of the heat exchanger.

U.S. Pat. No. 4,391,235 has disclosed an exhaust-gas heat recovery appliance which is arranged downstream of an exhaust-gas catalyst, in terms of the flow of exhaust gas, and has an exhaust line with a muffler. Running parallel with the muffler is a bypass line, which can be supplied with exhaust gas via a valve device. In the bypass line there is a heat exchanger, via which heat from the exhaust gas can be fed to engine coolant.

U.S. Pat. No. 4,884,744 is concerned with a heating system for the interior of a motor vehicle with an internal combustion engine. The system has, in addition to a multiplicity of heat exchangers that feed heat from hot engine-operating fluids, e.g. oil or compressed air, to the interior heating system, an exhaust-gas heat exchanger, which is arranged in a bypass line to the main exhaust duct and through which a heating fluid to be warmed flows. Arranged in the bypass line is a throttle valve, which is actuated as a function of the temperature of the heating medium.

U.S. Pat. No. 3,968,649 discloses an exhaust-gas purification system that operates with heat exchangers in the exhaust duct in order to condense some of the pollutants as a liquid that can be separated off or as solids that can be separated off.

U.S. Pat. No. 2,087,411 has likewise disclosed an exhaust-gas condensing device with a condensate separator in which a filter for purifying the condensate is arranged. This appliance is intended to recondense unburnt fuel components in the exhaust gas and feed them back to the engine.

U.S. Pat. No. 5,121,602 has disclosed an exhaust-gas purification appliance that is intended for separating off certain components of the exhaust gas.

With the exhaust-gas heat recovery appliances described above, there is the problem that water in vapor form contained in the exhaust gas condenses due to the removal of heat and is present as a liquid in the exhaust duct.

In the cold part of the year, this liquid can lead to icing in the exhaust duct of the exhaust-gas heat exchanger and, in particular, to icing of exhaust-gas valves arranged in the exhaust duct, thus limiting their operation or even preventing them from operating.

It is the object of the invention to provide an exhaust-gas heat recovery appliance with which the risk of icing is reduced, in particular eliminated. Moreover, the exhaust-gas heat recovery appliance should be of space-saving and economical configuration.

SUMMARY OF THE INVENTION

These objects are achieved in the exhaust-gas heat recovery appliance of this invention.

An exhaust-gas heat recovery appliance according to the present invention has a heat-exchanger line and a bypass line, a heat exchanger being arranged in the region of the heat-exchanger line, and at least one valve device for the purpose of influencing the mass flow of exhaust gas being provided in the heat-exchanger line and the bypass line, at least the heat-exchanger line having a slope in a direction of flow of the exhaust gas in the installed position.

In the installed position, the bypass line likewise advantageously has a slope in the direction of flow of the exhaust gas.

To ensure that condensed water does not run back into the heat-exchanger the engine is switched off and thereby potentially icing up the heat exchanger, the slope of the heat-exchanger line is expediently less than the slope of the bypass line. This difference in the slope has the effect that there is a vertical difference in height between the end of the heat-exchanger line and the end of the bypass line. The condensed water flowing back would have to overcome this height to flow back to the heat exchanger. The vertical difference in height acts as a barrier to the return flow of condensate. To minimize the additional pressure drop of the exhaust gases in the heat-exchanger line, the piece of tube used to overcome this vertical difference in height and is embodied in an S-shape.

It is particularly advantageous that at least one valve appliance is arranged in the heat-exchanger line upstream of the heat exchanger.

BRIEF DESCRIPTION OF THE DRAWINGS

The invention is explained in detail below by way of example with reference to the drawing, in which.

DETAILED DESCRIPTION

Figure 1:
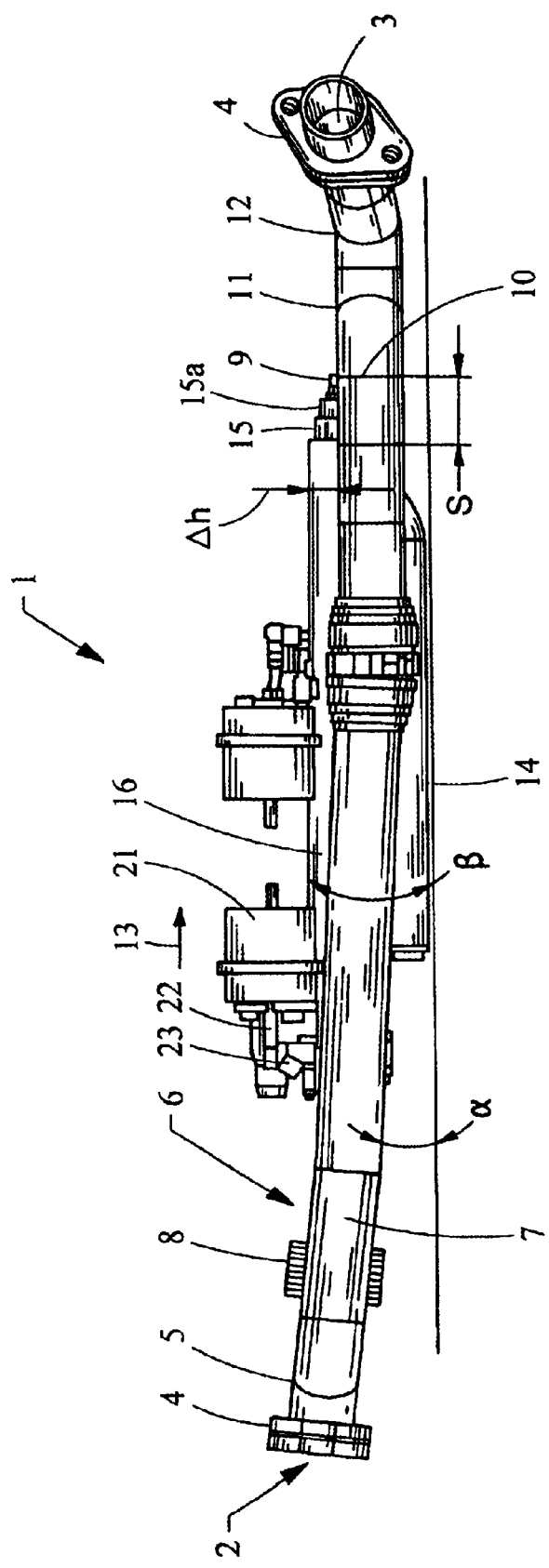
FIG. 1 shows in side view an exhaust-gas heat recovery appliance according to the invention.
Figure 2:
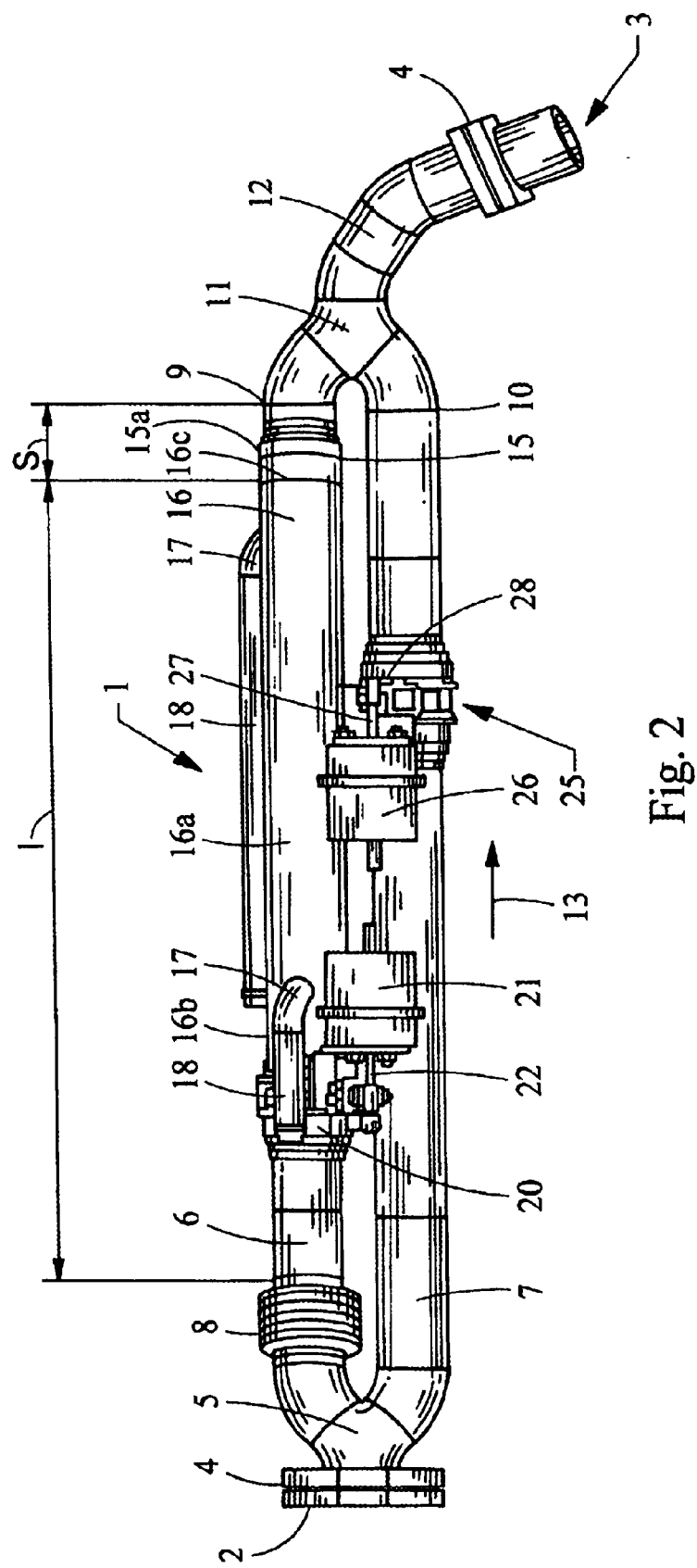
FIG. 2 shows in a plan view the exhaust-gas heat recovery appliance according to the invention shown in FIG. 1.

An exhaust-gas heat recovery appliance 1 according to the invention (FIG. 1, FIG. 2) has an exhaust-gas inlet opening 2 arranged upstream in terms of the flow of exhaust gas and an exhaust-gas outlet opening 3 arranged downstream in terms of the flow of exhaust gas.

Mounted on the exhaust-gas inlet opening 2 and the exhaust-gas outlet opening 3 are respective fastening means 4 for fastening the exhaust-gas heat recovery appliance 1 to components of the exhaust system, e.g. that of a motor vehicle, which are arranged upstream in terms of the flow of exhaust gas and downstream in terms of the flow of exhaust gas.

An exhaust-gas heat recovery appliance 1 according to the invention is expediently arranged downstream of an exhaust-gas catalyst.

Arranged following the inlet opening 2 is a first exhaust-pipe fork 5, which divides the exhaust duct connected to the inlet side of the exhaust-gas heat recovery appliance 1 into a first exhaust line (heat-exchanger line 6) and a second exhaust line (bypass line 7).

Arranged between the heat-exchanger line 6 and the exhaust-line fork 5 there is expediently a corrugated tube 8, which compensates for any differences in expansion that may occur owing to differences in the heating of lines 6 and 7. To avoid accumulation of condensed water in the inner, lower corrugations of the corrugated tube, the corrugated tube is expediently arranged in the region of the hotter exhaust gas, ahead of the heat exchanger.

In plan view (FIG. 2), the heat-exchanger line 6 and the bypass line 7 run parallel to one another at a short distance apart.

At downstream ends 9 and 10 of the heat-exchanger line 6 and of the bypass line 7, these lines open into a second exhaust-line fork 11, which reunites the two component lines 6, 7 into one exhaust line 12.

In an installed position or orientation in a motor vehicle (FIG. 1), the exhaust-gas heat recovery appliance 1 according to the invention is arranged in such a way that both the heat-exchanger line 6 and, expediently, also the bypass line 7 slope, relative to the horizontal 14, downward in the direction 13 of flow of the exhaust gas.

The bypass line 7 encloses an angle a with the horizontal 14. The heat-exchanger line 6 encloses an angle β with the horizontal 14. The angles α and β are expediently between 5° and 20°.

The slope chosen for the bypass line 7 is expediently greater than that for the heat-exchanger line 6, with the result that the angle α is larger than the angle β. This difference in slope has the effect that there is a vertical difference in height Δh between the heat-exchanger line 6 and the bypass line 7 at a point before the ends 9, 10. The difference in slope between the angle α and the angle β is expediently chosen so that the vertical difference in height Δh is between 0.2*d and 0.5*d, d being the diameter of the heat-exchanger line 6.

Toward the end 9, the heat-exchanger line 6 has a line element 15 bent in an s shape which compensates for the vertical difference in height Δh with respect to the bypass line 7 over a distance s that is very short in relation to the length l of the heat-exchanger line 6, the result being that the heat-exchanger line 6 and the bypass line 7 open into the second fork 11 at a common vertical level in the region of the ends 9, 10.

To ensure that the pressure drop on the exhaust side, which occurs within the line element 15 bent in an S-shape, is limited, the ratio of the distance s to the vertical difference in height Δh is between 3 and 8.

The steep path of the line element 15 serves as a barrier to the return flow of exhaust-gas condensate, making it impossible for condensate to remain in the region of the heat-exchanger line 6 and flow back when, for example, the vehicle is parked on a slope.

A tube-bundle heat exchanger 16 is incorporated within the heat-exchanger line 6 over a large part of its length. The significant components are a multiplicity of inner through tubes, through which exhaust gas flows in parallel, which are soldered into two tube plates (not shown) at both ends. The medium to be warmed (e.g. coolant) flows between the outer walls of the through tubes and the inner wall of the jacket tube 16. Tube connection pieces 18 for connection of, for example, coolant lines, are arranged in the region of the ends 16b, 16c of the heat-exchanger tube 16a, which are upstream and downstream in terms of the flow of exhaust gas, by means of a curved piece 17.

Arranged above the end 16b of the heat-exchanger jacket tube 16, which is upstream in terms of the flow of exhaust gas, is an exhaust-gas valve 20. The valve 20 can shut off or expose the internal cross section of the heat exchanger line 6 in the manner of a throttle valve. The exhaust-gas valve 20 can be actuated in an infinitely variable manner via an actuating device 21, e.g. a vacuum actuating device, via a push rod 22 connected to an actuating lever 23 of the valve 20.

In addition, the exhaust-gas valve 20 has a self-regulating exhaust-gas backpressure control function in the closed state. In the closed state of the flap valve, a torque acts on the stem of the valve flap via the actuating lever 23 by means of a spring preload within the vacuum actuating device. Because the valve stem is arranged eccentrically within the valve flap, an exhaust-gas backpressure produces a torque on the stem of the valve flap counter to the above torque. Where the two torques are in equilibrium, this valve arrangement sets a constant exhaust-gas back pressure.

Arranged in the bypass line 7 there is likewise a valve device 25, which can shut off and expose the bypass line 7 via a second actuating unit 26 by means of a push rod 27 and a lever 28.

The valve device 25 also is arranged as far as possible upstream in the bypass line 7 in terms of the flow of exhaust gas, depending on the installation-space conditions in the motor vehicle.

The tube-bundle heat exchanger 16 can be operated as a co-current or counter-current heat exchanger depending on the direction of flow of the fluid to be warmed.

The exhaust-gas heat recovery appliance 1 according to the invention reliably prevents icing of exhaust-gas valves because, on the one hand, these valve devices are arranged as far as possible upstream in terms of the flow of exhaust gas, with the result that the exhaust gas flowing through the valve devices is at as high a temperature as possible.

Only after it has flowed through the exhaust-gas valve 20 is heat removed from the exhaust gas in the tubular heat exchanger 16, with the result that condensate can form from the exhaust gas only downstream in terms of the flow of exhaust gas.

On the other hand, the sloping arrangement of the heat-exchanger line 6 and the bypass line 7 ensures that any exhaust-gas condensate that forms flows away from the valve devices 20, 25 owing to gravity and is taken along with the flowing exhaust gas.

The particularly preferred arrangement of the heat-exchanger line 6, which is vertically higher than the bypass line 7 by an amount Δh in its end region, and the subsequently steeper line element 15 in the form of an s bend reliably prevent any condensate that forms in the flow of exhaust gas flowing "upward" in the tubular heat exchanger 16, counter to the direction 13 of flow of the exhaust gas, owing to backpressure or pressure fluctuations in the exhaust system.

Because of its relatively steep path, the line element 15 in the form of a double s thus represents a barrier to the return flow of condensate which might be taken along upstream by a reversal in the flow of exhaust gas due to pressure fluctuations in the exhaust system, for example. Thus, according to the invention, icing is avoided in a space- and installation-space-saving manner through the appropriate choice of the tube paths, without additional components.

What is claimed is:

1. An exhaust-gas heat recovery appliance comprising a heat exchanger line and a bypass line installed at a position on a motor vehicle, the heat exchanger line and the bypass line connected at their upstream ends to a first exhaust-line fork and downstream at their downstream ends to a second exhaust-line fork, a heat exchanger being arranged in the region of the heat-exchanger line, an "S" shaped line element in the heat-exchanger line located upstream of an inlet of the second exhaust-line fork, and at least one valve device adapted to influence the mass flow of exhaust gas being provided in the heat-exchanger line and the bypass line, wherein, in the installed position the heat-exchanger line and the bypass line run parallel to one another a short distance apart in plan view, and when viewed from the side at least the heat-exchanger line has a slope in a direction of flow of the exhaust gas and the "S" shaped line element has a slope steeper than the slope of the heat-exchanger line to act as a barrier to return flow.

2. The exhaust-gas heat recovery appliance as claimed in claim 1 wherein, in the installed position, the bypass line has a slope in the direction of flow of the exhaust gas.

3. The exhaust-gas heat recovery appliance as claimed in claim 1 wherein the slope of the heat-exchanger line is less than the slope of the bypass line.

4. The exhaust-gas heat recovery appliance as claimed in claim 1 wherein the at least one valve device is arranged in the heat-exchanger line upstream of the heat-exchanger.

5. The exhaust-gas heat recovery appliance as claimed in claim 4 wherein a further valve device is arranged in the by-pass line.

6. The exhaust-gas heat recovery appliance as claimed in claim 5 wherein the valve devices are arranged in the highest possible upstream position.

7. The exhaust-gas heat recovery appliance as claimed in claim 1 wherein a corrugated tube is arranged between the heat-exchanger line and the first exhaust-line fork.

8. The exhaust-gas heat recovery appliance as claimed in claim 1 wherein the downstream ends of the heat-exchanger line and the bypans line open into an exhaust-line fork.

9. The exhaust-gas heat recovery appliance as claimed in claim 1 wherein there is a vertical difference in height $\Delta h$ between the heat-exchanger line and the bypass line at some point before the ends, which difference is compensated for by the "S" shaped line element over a distance s.

10. The exhaust-gas heat recovery appliance as claimed in claim 9 wherein the difference in height $\Delta h$ is between $0.2*d$ and $0.5*d$, d being the diameter of the heat-exchanger line.

11. The exhaust-gas heat recovery appliance as claimed in claim 10 wherein the ratio of the distance s to the vertical difference in height $\Delta h$ is no less than 3 and no more than 8.

12. The exhaust-gas heat recovery appliance as claimed in claim 1 wherein the heat exchanger is a tube-bundle heat-exchanger arranged within the heat exchanger line.

13. The exhaust-gas heat recovery appliance as claimed in claim 1 wherein an exhaust-gas valve constructed in the manner of a throttle valve is arranged at the upstream end of the heat-exchanger, in terms of the flow of exhaust gas, and can be actuated in an infinitely variable manner via an actuating device.

14. The exhaust-gas heat recovery appliance as claimed in claim 13 wherein the exhaust-gas valve is arranged in an upstream position that is the position that is vertically the highest possible, depending on the installation-space conditions.

15. The exhaust-gas heat recovery appliance as claimed in claim 13 wherein the valve device in the heat-exchanger line is designed as a backpressure control valve.

16. The exhaust-gas heat recovery appliance as claimed in claim 12 wherein the tube-bundle heat exchanger is designed as a co-current or counter-current heat exchanger.

17. The exhaust-gas heat recovery appliance as claimed in claim 12 wherein a valve is arranged as far as possible upstream in the by-pass line, in terms of the flow of exhaust gas, depending on the installation-space conditions in the motor vehicle.

* * * * *